(12) United States Patent
Kang et al.

(10) Patent No.: US 8,119,090 B2
(45) Date of Patent: Feb. 21, 2012

(54) NICKEL-CARBONITRIDE SPHERES AND METHOD OF MAKING THE SAME

(75) Inventors: Jeung-Ku Kang, Daejeon (KR); Se-Yun Kim, Daejeon (KR); Jun-Ho Kwon, Daejeon (KR); Seung-Jun Heo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 84 days.

(21) Appl. No.: 12/824,099

(22) Filed: Jun. 25, 2010

(65) Prior Publication Data

US 2011/0038780 A1 Feb. 17, 2011

(30) Foreign Application Priority Data

Aug. 11, 2009 (KR) ........................ 10-2009-0073899

(51) Int. Cl.
*C01C 3/08* (2006.01)
*C01G 1/00* (2006.01)

(52) U.S. Cl. ........................................ 423/371; 423/138
(58) Field of Classification Search .................. 423/138, 423/371; 502/102, 103, 180, 182, 185, 200, 502/259, 313, 315, 325, 326, 337
See application file for complete search history.

(56) References Cited

U.S. PATENT DOCUMENTS 5,866,202 A * 2/1999 Nastke et al. ............ 427/213.34
2006/0264325 A1* 11/2006 Wu ............................... 502/418

* cited by examiner

*Primary Examiner* — Stanley Silverman
*Assistant Examiner* — Justin Bova
(74) *Attorney, Agent, or Firm* — Knobbe Martens Olson & Bear LLP

(57) ABSTRACT

Disclosed is a method for preparation of a nickel-carbonitride sphere, which includes preparing a melamine-formaldehyde resin, adding a nickel salt and a surfactant to the melamine-formaldehyde resin to prepare a nickel-melamine resin mixture, and conducting spray pyrolysis for the mixture to produce nickel-containing powder including nickel-carbonitride spheres. In addition, this method may further include thermal treatment of the nickel-containing powder.

18 Claims, 8 Drawing Sheets

NICKEL-CARBONITRIDE SPHERES AND METHOD OF MAKING THE SAME

This application claims priority to Korean Patent Application No. 2009-0073899, filed on Aug. 11, 2009, in the Korean Intellectual Property Office, the entire contents of which are hereby incorporated by reference.

BACKGROUND OF THE INVENTION

1. Field of the Invention

The present invention relates to a method for preparation of nickel-carbonitride spheres with controlled structure, and nickel-carbonitride spheres prepared by the same.

2. Description of the Related Art

A porous material having enlarged surface area per unit weight and a large inner space is currently the subject of many studies and being investigated for various applications including, for example, supporting of metal catalysts, surface adsorption of gas molecules and storage of chemical substances. Such porous material is generally classified into three kinds of materials depending on size of pores as follows: microporous materials with a diameter of less than 2 nm; mesoporous materials with a diameter of from 2 to 50 nm; and macroporous materials with a diameter of at least 50 nm.

Moreover, there is a research report disclosing that carbon nitride contains nitrogen easily adsorbing nano-scale metal particles therein and stores lithium considerably better than pure carbon.

A porous material comprising carbon nitride may be used in a variety of applications such as storage of chemical substances, supporters including metal catalysts, etc., and therefore, there is a strong requirement to develop a simple process for preparation of carbon nitride based porous materials.

SUMMARY OF THE INVENTION

One aspect of the present invention provides a method for preparation of nickel-carbonitride spheres with different structures by a simple spray pyrolysis process, and nickel-carbonitride spheres prepared by the same.

One embodiment of the present invention provides a method for preparation of a nickel-carbonitride sphere comprising: preparing a melamine-formaldehyde resin by mixing a formaldehyde solution with melamine and agitating the mixture; adding a nickel salt and surfactant to the melamine-formaldehyde resin to prepare a nickel-melamine resin mixture; conducting spray pyrolysis for the mixture to produce a solid powder containing nickel; and washing the solid powder with an ethanol solution then vacuum drying the same to form the nickel-carbonitride sphere.

According to the inventive method, varying a process temperature for the spray pyrolysis (hereinafter, a spray pyrolysis temperature), an amount of nickel salt and/or thermal treatment under a hydrogen or nitrogen atmosphere may control a structure of the nickel-carbonitride sphere.

BRIEF DESCRIPTION OF THE DRAWINGS

The above and other features and other advantages of the present invention will be more clearly understood from the following detailed description taken in conjunction with the accompanying drawings, in which.

DETAILED DESCRIPTION OF THE INVENTION

One aspect of the present invention provides a method for preparation of a nickel-carbonitride sphere, comprising: preparing a melamine-formaldehyde resin by mixing a formaldehyde solution with melamine and agitating the mixture; adding a nickel salt and surfactant to the melamine-formaldehyde resin to prepare a nickel-melamine resin mixture; conducting spray pyrolysis for the mixture to produce a solid powder containing nickel; and washing the solid powder with an ethanol solution then vacuum drying the same to complete formation of the nickel-carbonitride sphere.

The method may further comprise thermal treatment of the nickel-carbonitride sphere under a hydrogen atmosphere or nitrogen atmosphere so as to generate nickel particles inside the nickel-carbonitride sphere.

The obtained nickel-carbonitride sphere may have a structure varied depending on a spray pyrolysis temperature.

A shell thickness of the nickel-carbonitride sphere may be varied depending on an amount of the nickel salt.

Another aspect of the present invention is to provide a nickel-carbonitride sphere prepared by the foregoing method.

Hereinafter, one embodiment of the present invention will be described in greater detail with reference to the following preparative examples, experimental examples and comparative examples. However, these examples are intended for illustrative purposes and it would be appreciated by a person skilled in the art that various modifications and variations may be made without departing from the scope of the present invention. Therefore, it is not construed that the present invention is restricted to such examples.

EXAMPLES

Preparative Example 1

Nickel-Carbonitride Sphere

Figure 1:
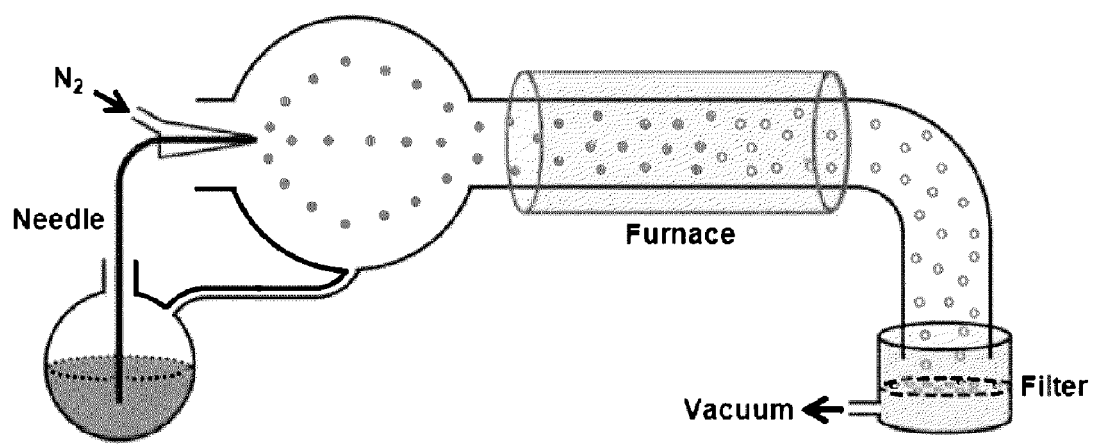
FIG. 1 is a schematic view showing a process for preparation of nickel-carbonitride spheres according to one embodiment of the present invention.

The following description will be given of a process for preparation of a nickel-carbonitride sphere according to one embodiment of the present invention, as shown in FIG. 1.

First, 8.924 mL of formaldehyde and 100 mL of water were poured into 250 mL of a round-bottom flask to prepare an aqueous formaldehyde solution.

Adding 0.2 mL of 1M NaOH solution as well as 5.044 g of melamine to the above formaldehyde solution, the mixture was well blended under stirring and heated at 100° C. for 15 minutes. The resultant clear transparent melamine-formaldehyde resin was cooled to room temperature.

Mixing the melamine-formaldehyde resin together with 0.951 g of nickel chloride hexahydrate as a nickel salt and 4 g of cetyl trimethylammonium bromide (CTAB), a nickel-melamine resin mixture was obtained. Here, an amount of nickel ions contained in the nickel salt was 5 at % (atomic percent) relative to melamine.

Then, according to spray pyrolysis process, the nickel-melamine resin mixture was sprayed while flowing $N_2$ gas around a needle to form spherical drops, followed by passing the spherical drops of the nickel-melamine resin mixture through a furnace to solidify the drops, so as to form a solid powder containing nickel. The powder was entrapped on a filter.

The nickel containing solid powder was washed with an ethanol solution including ethanol and water in volumetric ratio of 1:1 and dried at 60° C. under vacuum, thus fabricating a nickel-carbonitride sphere.

Preparative Example 2

Thermal Treatment of Nickel-Carbonitride Sphere Under Hydrogen Atmosphere

The nickel-carbonitride sphere prepared in Preparative Example 1 was additionally subjected to a process for thermal treatment under a hydrogen atmosphere.

As a result, nickel particles or pores (mesopores or micropores) were formed inside the nickel-carbonitride sphere.

Preparative Example 3

Thermal Treatment of Nickel-Carbonitride Sphere Under Nitrogen Atmosphere

The nickel-carbonitride sphere prepared in Preparative Example 1 was additionally subjected to a process for thermal treatment under a nitrogen atmosphere.

As a result, nickel particles or pores (mesopores or micropores) were formed inside the nickel-carbonitride sphere.

Example 1

Nickel-Carbonitride Sphere Depending on Spray Pyrolysis Temperature

A structure of the nickel-carbonitride sphere depending on a spray pyrolysis temperature was investigated.

Figure 2:
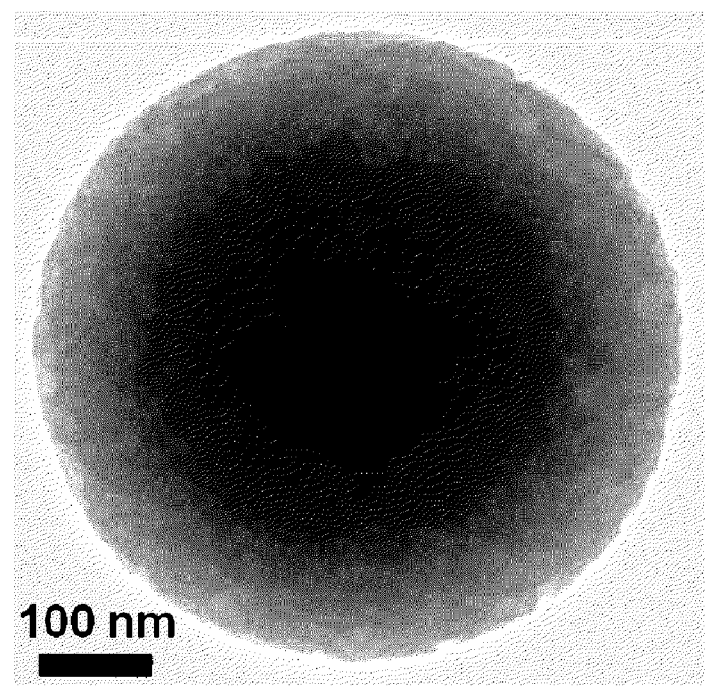
FIG. 2 is a TEM photograph showing a nickel-carbonitride sphere A prepared in Example 1.
Figure 3:
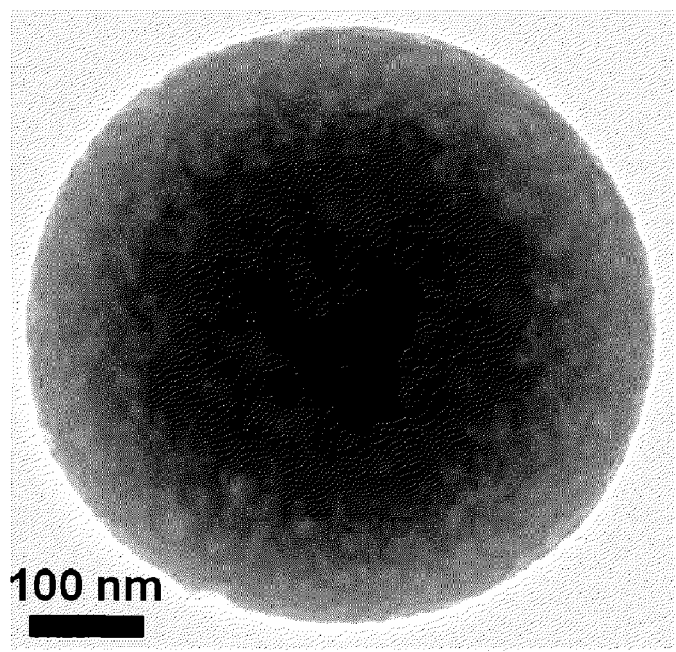
FIG. 3 is a TEM photograph showing a nickel-carbonitride sphere B prepared in Example 1.
Figure 4:
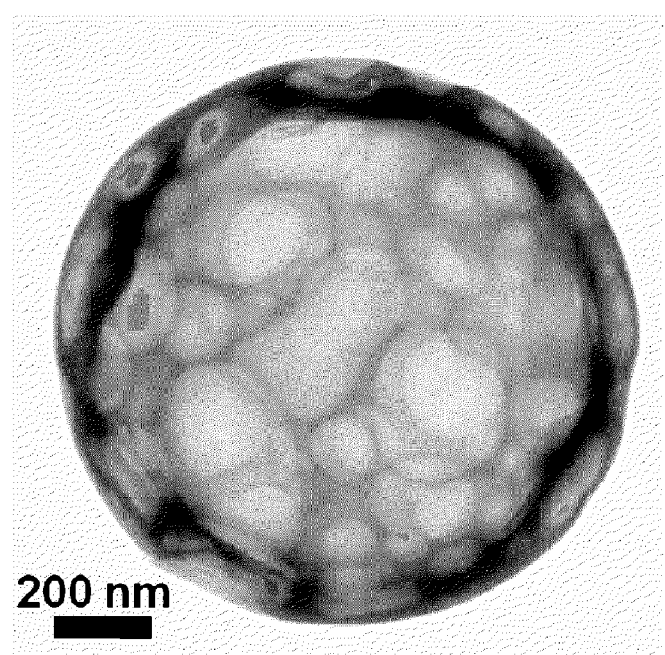
FIG. 4 is a TEM photograph showing a nickel-carbonitride sphere C prepared in Examples 1 and 2.
Figure 5:
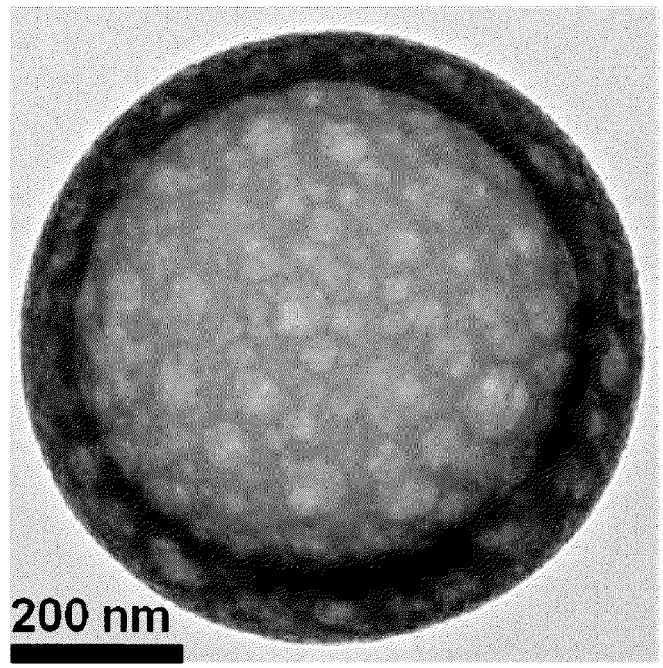
FIG. 5 is a TEM photograph showing a nickel-carbonitride sphere D prepared in Example 2.
Figure 6:
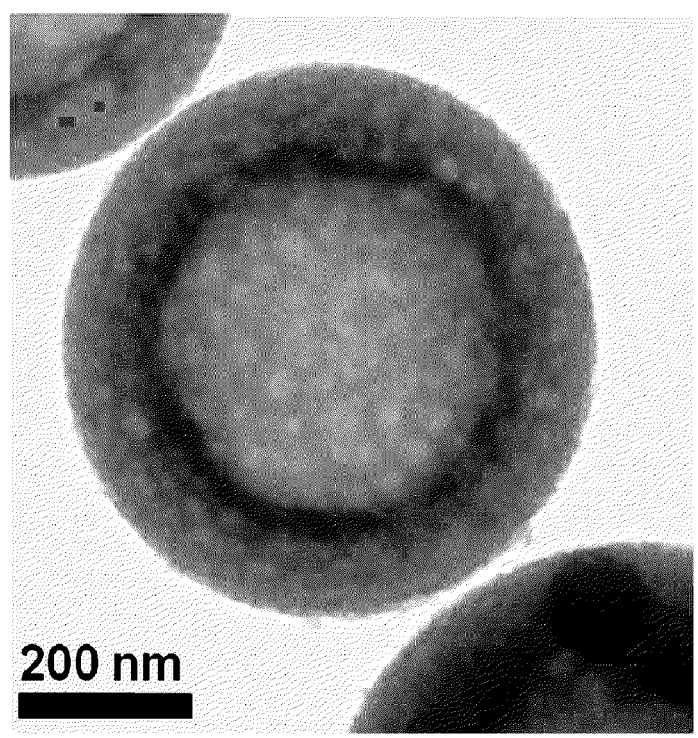
FIG. 6 is a TEM photograph showing a nickel-carbonitride sphere E in Example 2.
Figure 7:
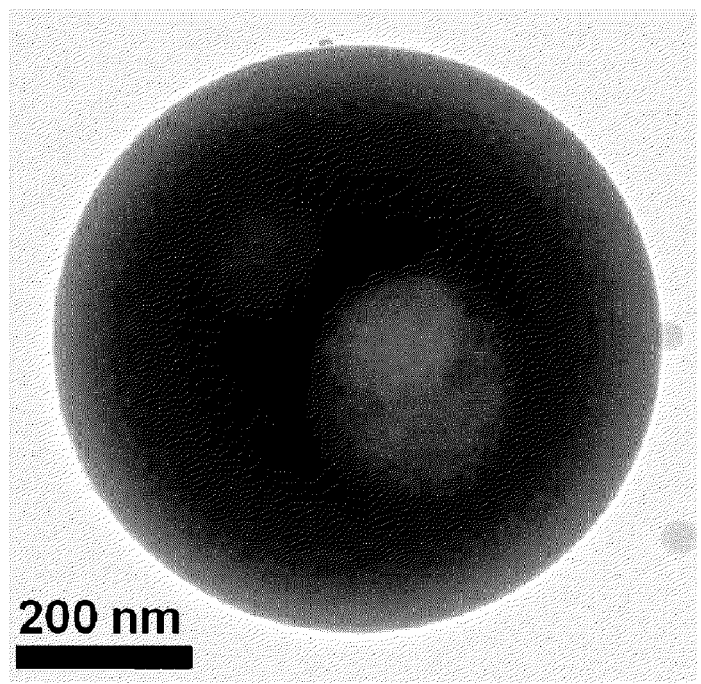
FIG. 7 is a TEM photograph showing a nickel-carbonitride sphere F in Example 2.

For preparation of the nickel-carbonitride sphere according to Preparative Example 1, a temperature of a furnace was set to 400° C., 500° C. and 600° C., in order to execute experiments three times so as to produce nickel-carbonitride spheres A, B and C, respectively. FIGS. 2, 3 and 4 showed TEM photographs of these spheres, respectively. The obtained results are shown in the following Table 1.

TABLE 1

| Type | Temperature of furnace (° C.) | Shape of nickel-carbonitride sphere |
| --- | --- | --- |
| Nickel-carbonitride sphere A | 400 | Solid structure (FIG. 2) |
| Nickel-carbonitride sphere B | 500 | Solid structure (FIG. 3) |
| Nickel-carbonitride sphere C | 600 | Hollow structure, shell of nickel-carbonitride sphere with nano-scale pores (FIG. 4) |

FIGS. 2 and 3 illustrated the nickel-carbonitride spheres having a solid structure, while the nickel-carbonitride sphere in FIG. 4 has a hollow structure. In other words, the present invention may control a shape of the nickel-carbonitride sphere by regulating a spray pyrolysis temperature.

Example 2

Shell Thickness of Nickel-Carbonitride Sphere Depending on Amount of Nickel Salt A shell thickness of the nickel-carbonitride sphere in relation to an amount of the nickel salt was investigated.

For preparation of the nickel-carbonitride sphere according to Preparative Example 1, an amount of nickel ions contained in the nickel salt relative to melamine was adjusted to 5 at % (atomic percent), 10 at %, 15 at % and 30 at %, respectively, in order to execute experiments four times. Here, a spray pyrolysis temperature was set to 600° C. As a result, four types of nickel-carbonitride spheres C, D, E and F were obtained and FIGS. 4, 5, 6 and 7 showed TEM photographs of these nickel-carbonitride spheres, respectively. In consideration of different sizes of the foregoing spheres, a ratio of the shell thickness to particle radius of each of the spheres was calculated in order to compare thickness between the spheres. Results thereof are summarized in the following Table 2.

TABLE 2

| Type | Nickel salt | Ratio of shell thickness/radius of nickel-carbonitride sphere (%) |
| --- | --- | --- |
| Nickel-carbonitride sphere C | 5 | 14.63 (FIG. 4) |
| Nickel-carbonitride sphere D | 10 | 20.47 (FIG. 5) |

TABLE 2-continued

| Type | Nickel salt | Ratio of shell thickness/radius of nickel-carbonitride sphere (%) |
|---|---|---|
| Nickel-carbonitride sphere E | 15 | 34.19 (FIG. 6) |
| Nickel-carbonitride sphere F | 30 | 66.94 (FIG. 7) |

As shown in the above Table 2, it can be seen that from FIG. 4 to FIG. 7 in sequential order (as an amount of nickel salt relative to melamine increases), a ratio of shell thickness/radius of the nickel-carbonitride sphere was elevated, in turn, the shell thickness was increased. That is, according to one aspect of the present invention, the shell thickness of the nickel-carbonitride sphere may be controlled by varying an amount of the nickel salt.

Example 3

Thermal Treatment of Nickel-Carbonitride Sphere Under Hydrogen Atmosphere

Thermally treating each of the nickel-carbonitride spheres A, B and C prepared in Example 1 at 400° C. under a hydrogen atmosphere for 3 hours according to Preparative Example 2, a resulting structure of the sphere was investigated.

Figure 8:
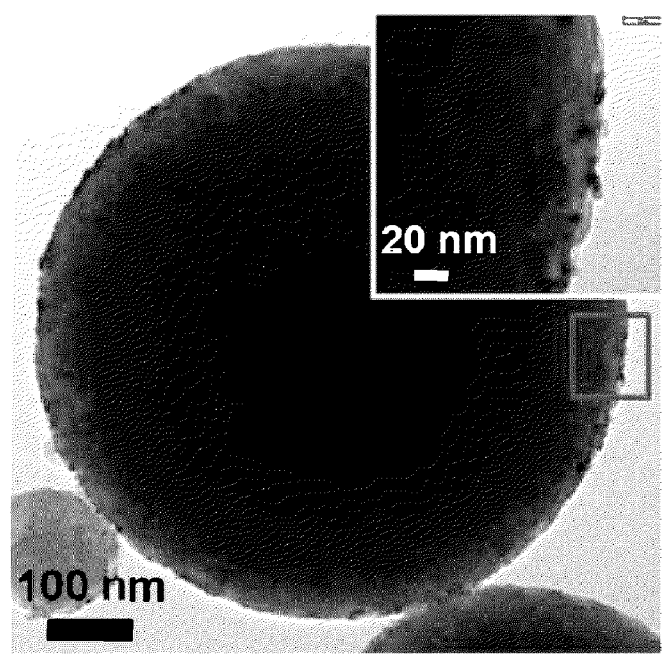
FIG. 8 is a TEM photograph showing nickel-carbonitride finally produced by thermally treating the nickel-carbonitride sphere A prepared in Example 1 at 400° C. under a hydrogen atmosphere.
Figure 9:
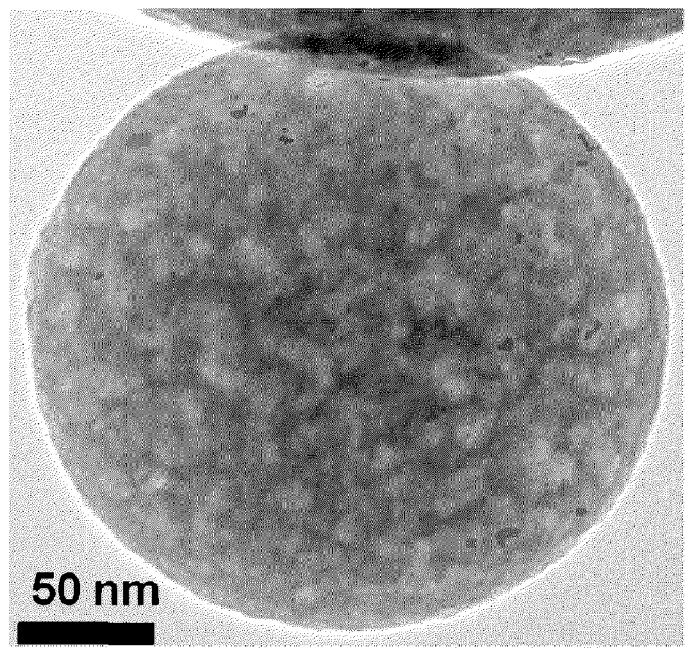
FIG. 9 is a TEM photograph showing nickel-carbonitride finally produced by thermally treating the nickel-carbonitride sphere B prepared in Example 1 at 400° C. under a hydrogen atmosphere.
Figure 10:
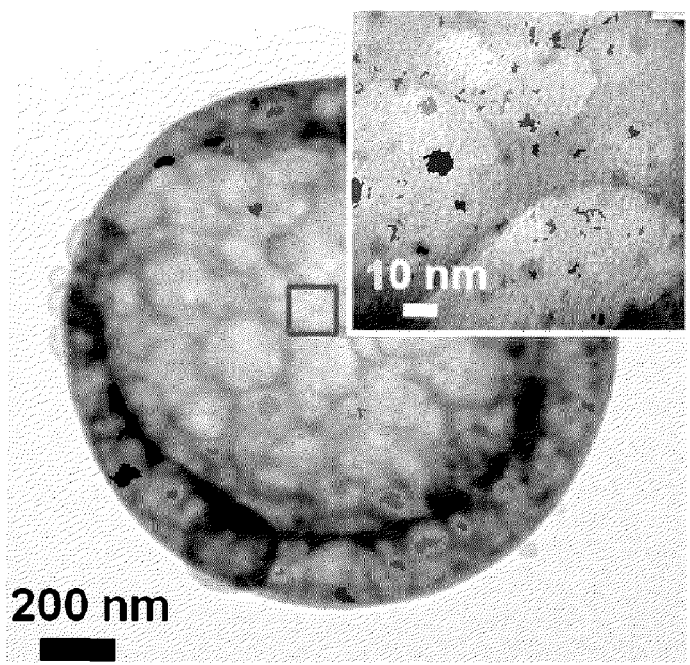
FIG. 10 is a TEM photograph showing nickel-carbonitride finally produced by thermally treating the nickel-carbonitride sphere C prepared in Example 1 at 400° C. under a hydrogen atmosphere.
Figure 13:
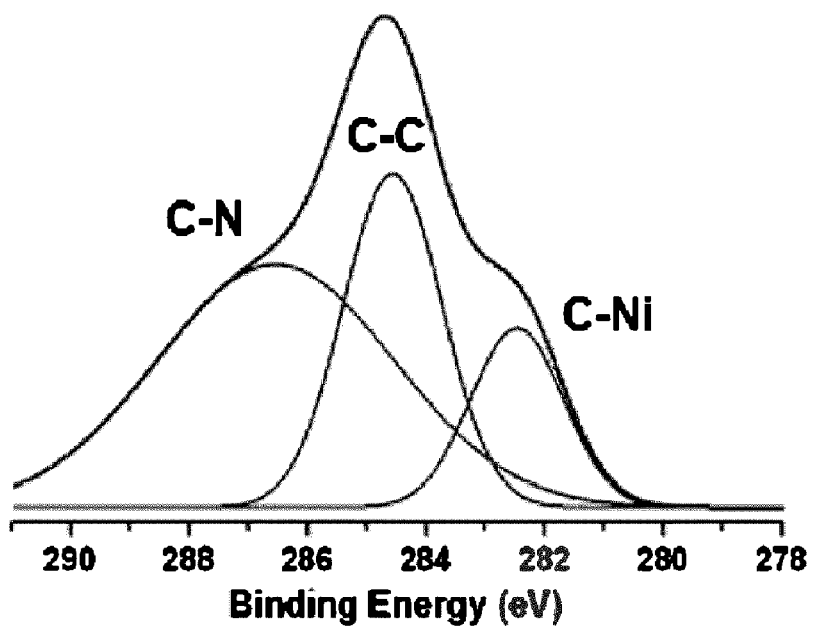
FIG. 13 is an XPS graph of the nickel-carbonitride finally produced by thermally treating the nickel-carbonitride sphere C prepared in Example 1 at 400° C. under a hydrogen atmosphere.
Figure 11:
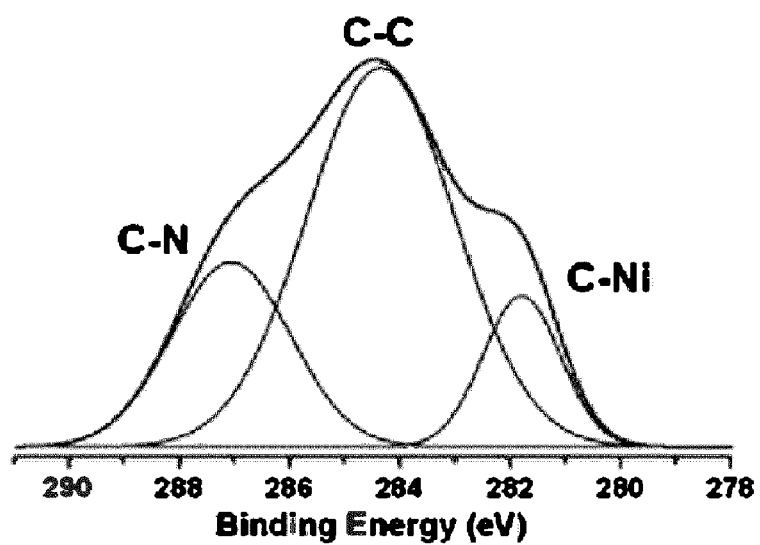
FIG. 11 is an XPS graph of the nickel-carbonitride finally produced by thermally treating the nickel-carbonitride sphere A prepared in Example 1 at 400° C. under a hydrogen atmosphere.
Figure 12:
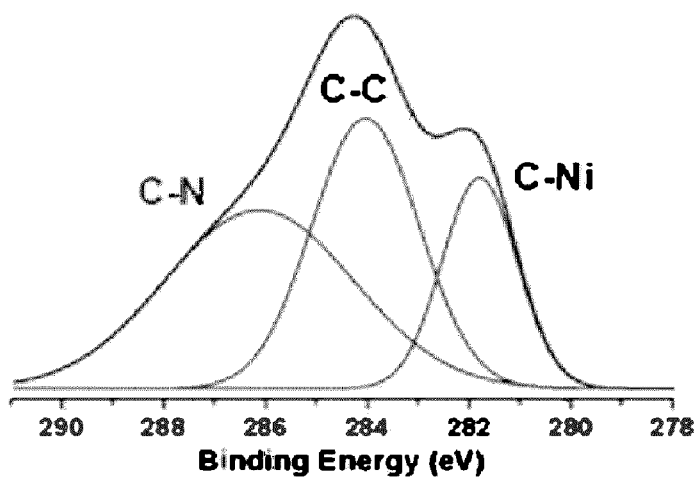
FIG. 12 is an XPS graph of the nickel-carbonitride finally produced by thermally treating the nickel-carbonitride sphere B prepared in Example 1 at 400° C. under a hydrogen atmosphere.

After thermal treatment, TEM photographs of the above prepared three spheres were taken and these TEM photographs are shown in FIGS. 8, 9 and 10 while XPS (X-ray photoelectron spectroscopy) graphs thereof are shown in FIGS. 11, 12 and 13, respectively. These results are summarized in the following Table 3.

TABLE 3

| Type | Temperature of furnace (° C.) | Temperature of $H_2$ atmosphere (° C.) | Structure of nickel-carbonitride sphere |
|---|---|---|---|
| Nickel-carbonitride sphere A | 400 | 400 | Nickel particle with 5 nm diameter formed in sphere (FIGS. 8 and 11) |
| Nickel-carbonitride sphere B | 500 | 400 | Pores with about 14 nm diameter formed in sphere (FIGS. 9 and 12) |
| Nickel-carbonitride sphere C | 600 | 400 | Nickel-particle with 9 nm diameter formed in sphere (FIGS. 10 and 13) |

In case that the nickel-carbonitride sphere A was thermally treated under a hydrogen atmosphere, nickel particles with a diameter of 5 nm were generated in the sphere (see FIG. 8). On the other hand, for the nickel-carbonitride sphere C thermally treated under a hydrogen atmosphere, nickel particles having a diameter of 9 nm were formed in the sphere (see FIG. 10).

Referring to graphs in FIGS. 11 and 13, it was found that C—C bond strength (that is, binding energy) is considerably higher than C—Ni bond strength. Owing to difference in bond strength, both the nickel-carbonitride spheres A and C have nickel particles formed therein. In contrast, FIG. 12 showed that C—C bond strength is substantially the same as C—Ni bond strength. Consequently, it can be seen that nickel atoms were uniformly distributed in the nickel-carbonitride sphere B and, therefore, the nickel-carbonitride sphere did not include nickel particles but had pores formed therein.

Accordingly, one embodiment of the present invention may control the size of the nickel particle formed in the nickel-carbonitride sphere or may form pores in the sphere by regulating a spray pyrolysis temperature (that is, a temperature of a furnace) or thermally treating the sphere under a hydrogen atmosphere.

Figure 14:
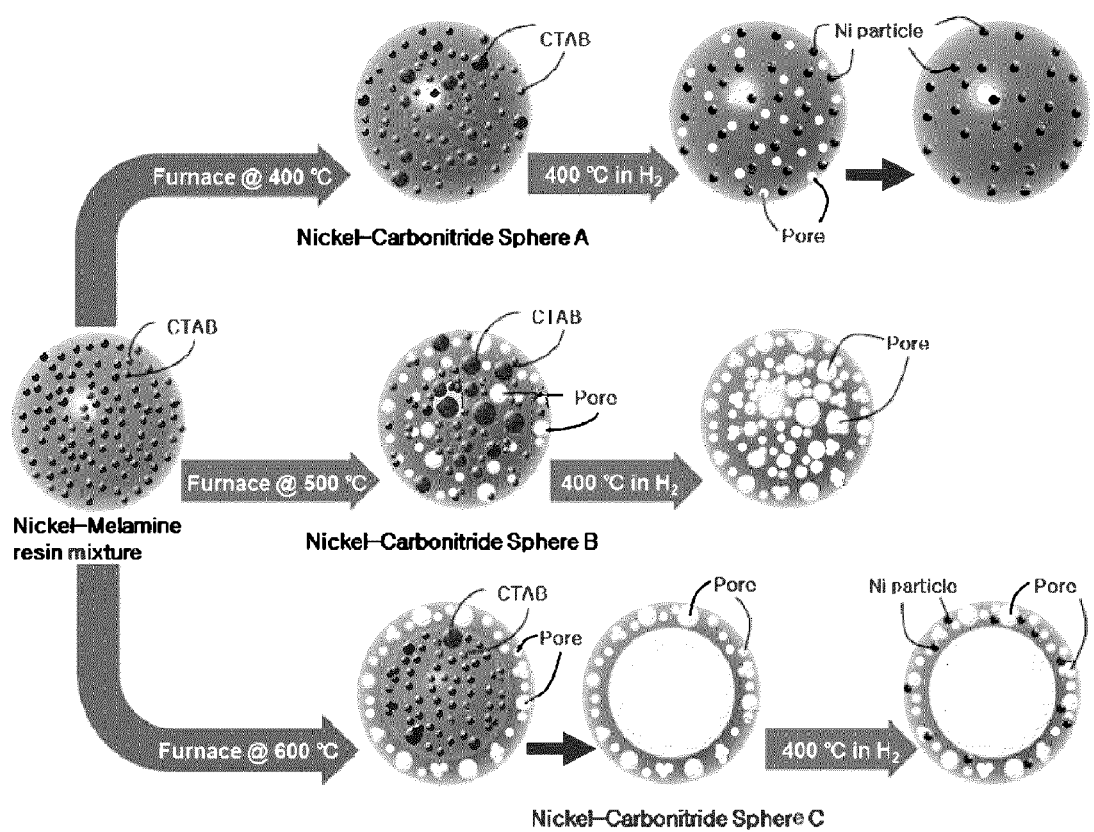
FIG. 14 schematically illustrates a structure of a nickel-carbonitride sphere finally formed by thermally treating the nickel-carbonitride sphere under a hydrogen atmosphere.

FIG. 14 schematically illustrates a structure of the nickel-carbonitride finally formed by thermal treatment of the previously prepared nickel-carbonitride sphere under a hydrogen atmosphere. The following description will be given with reference to FIG. 14.

First, the nickel-carbonitride sphere A is described in detail. A spherical nickel-melamine resin mixture prepared by a spraying process has CTAB uniformly distributed therein. While passing the mixture through a furnace at 400° C., the mixture was solidified from an outer side to inner side thereof so as to fabricate a nickel-carbonitride sphere A with a solid structure. After this, by thermally treating the nickel-carbonitride sphere A at 400° C. under a hydrogen ($H_2$) atmosphere, nickel ions dispersed in the sphere were converted into nickel atoms to form nickel (Ni) particles. At the same time, pores which appeared inside the nickel-carbonitride sphere, in turn, entirely disappeared after completion of the thermal treatment. The major reason for this fact is that the imperfect solidification of the nickel-melamine resin mixture has been further completed by thermal treatment under a hydrogen atmosphere while passing through the furnace at a relatively low temperature of 400° C., thus filling up an empty space of the pores.

Next, a detailed description for the nickel-carbonitride sphere B will be given below. While a spherical nickel-melamine resin mixture prepared by a spraying process passed through a furnace at 500° C., the mixture was solidified from outer side to inner side thereof so as to fabricate a nickel-carbonitride sphere B with a solid structure having pores filled up. After this, by thermally treating the nickel-carbonitride sphere B at 400° C. under $H_2$ atmosphere, the sphere had pores formed without nickel particles (see the description for FIG. 12).

Further, a detailed description for the nickel-carbonitride sphere C will be given below. While passing a spherical nickel-melamine resin mixture prepared by a spraying process through a furnace at 600° C., the mixture was solidified from outer side to inner side thereof so as to form a shell having pores. On the other hand, pyrolysis occurred inside the nickel-melamine resin mixture due to a high temperature of the furnace, leading to generation of an empty space. As a result, a nickel-carbonitride sphere C with a hollow structure having the shell was obtained. After this, by thermally treating the nickel-carbonitride sphere C at 400° C. under $H_2$ atmosphere, nickel ions dispersed in the nickel-carbonitride sphere converted into nickel atoms to form Ni particles. At the same time, pores appeared on the shell of the nickel-carbonitride sphere C.

Example 4

Thermal Treatment of Nickel-Carbonitride Sphere Under Nitrogen Atmosphere

After thermally treating the nickel-carbonitride sphere C prepared in Example 1 at 500° C. under a nitrogen ($N_2$) atmosphere for 4 hours according to Preparative Example 3, a resulting structure of the sphere was investigated.

Figure 15:
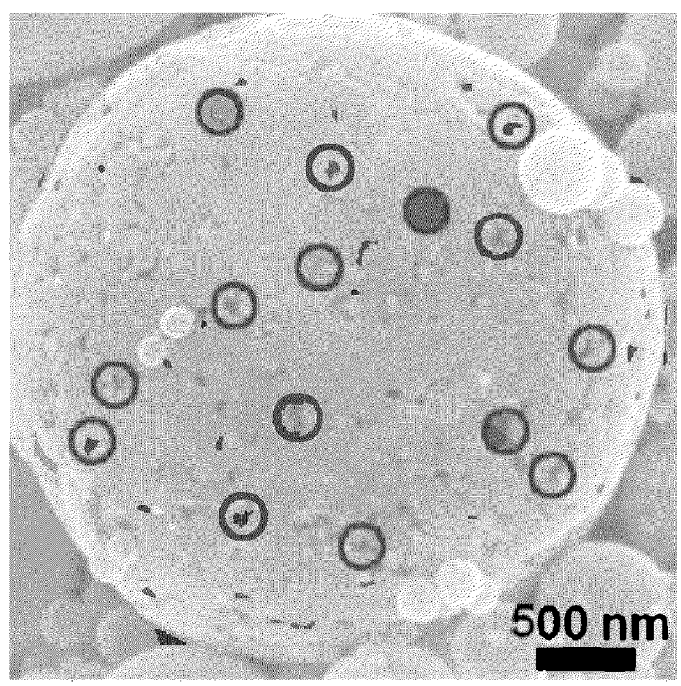
FIG. 15 is a SEM photograph showing a nickel-carbonitride sphere finally formed by thermally treating the nickel-carbonitride sphere C prepared in Example 1 at 500° C. under a nitrogen atmosphere.
Figure 16:
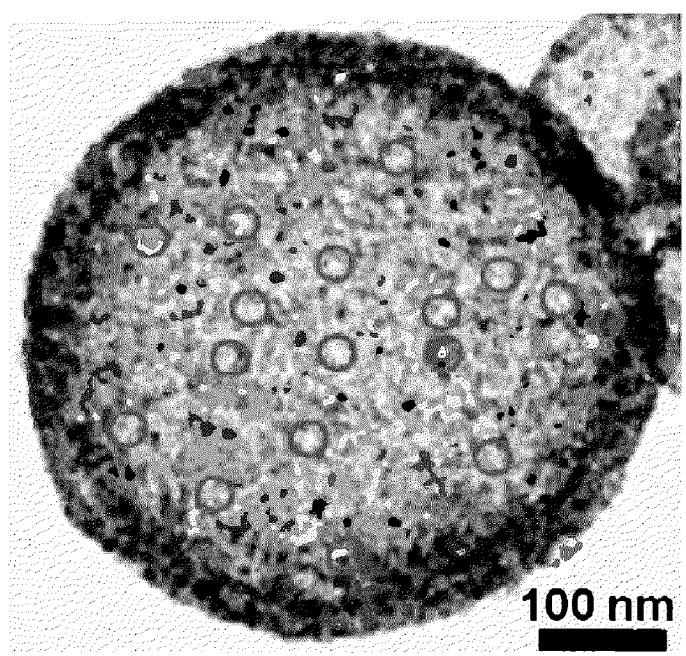
FIG. 16 is a TEM photograph showing a nickel-carbonitride sphere finally formed by thermally treating the nickel-carbonitride sphere C prepared in Example 1 at 500° C. under a nitrogen atmosphere.

After thermal treatment, SEM and TEM photographs of the above prepared sphere were taken and these photographs are shown in FIGS. 15 and 16, respectively. These results are summarized in the following Table 4.

TABLE 4

| Type | Temperature of furnace (°C.) | Temperature of N₂ atmosphere (°C.) | Structure of nickel-carbonitride sphere |
|---|---|---|---|
| Nickel-carbonitride sphere C | 600 | 500 | SEM photograph (FIG. 15) |
| Nickel-carbonitride sphere C | 600 | 500 | TEM photograph (FIG. 16) |

As shown in FIGS. 15 and 16, it was found that nano-scale nickel oxide particles were generated inside the nickel-carbonitride sphere and, in addition, mesopores and micropores were formed on the shell portion of the same sphere.

Accordingly, one embodiment of the present invention may form nickel particles in the nickel-carbonitride sphere as well as pores (mesopores and micropores) on the shell portion of the sphere by thermal treatment under a nitrogen atmosphere.

Although the present invention has been described in detail with reference to its presently preferred embodiment, it will be understood by those skilled in the art that various modifications and equivalents can be made without departing from the spirit and scope of the present invention, as set forth in the appended claims. Also, the substances of each constituent explained in the specification can be easily selected and processed by those skilled in the art from the well-known various substances. Also, those skilled in the art can remove a part of the constituents as described in the specification without deterioration of performance or can add constituents for improving the performance. Furthermore, those skilled in the art can change the order to methodic steps explained in the specification according to environments of processes or equipments. Thus, it is intended that the present invention covers the modifications and variations of this invention provided they come within the scope of the appended claims and their equivalents.

What is claimed is:

1. A method for preparation of nickel-carbonitride spheres, the method comprising:
   preparing a melamine-formaldehyde resin by mixing a formaldehyde solution with melamine and agitating the mixture;
   adding a nickel salt and a surfactant to the melamine-formaldehyde resin to prepare a nickel-melamine resin mixture;
   conducting spray pyrolysis of the nickel-melamine resin mixture to produce nickel-containing powder comprising nickel-carbonitride spheres;
   washing the nickel-containing powder; and
   drying the nickel-containing powder.

2. The method according to claim 1, further comprising:
   subsequent to drying, subjecting the nickel-containing powder to thermal treatment under an atmosphere of hydrogen or nitrogen.

3. The method according to claim 1, wherein a cross-sectional structure of the nickel-carbonitride sphere substantially varies based on a spray pyrolysis temperature.

4. The method according to claim 1, wherein a shell thickness of the nickel-carbonitride sphere is varied based on an amount of the nickel salt.

5. The method according to claim 4, wherein the spray pyrolysis temperature occurs at a temperature selected from the group consisting of about 400° C., about 500° C. and about 600° C.

6. A method of preparing nickel-carbonitride spheres, the method comprising:
   providing a melamine-formaldehyde resin;
   adding a nickel salt and a surfactant to the melamine-formaldehyde resin to provide a nickel-melamine resin mixture;
   conducting spray pyrolysis of the nickel-melamine resin mixture to produce nickel-containing powder comprising nickel-carbonitride spheres;
   washing the nickel-containing powder; and
   drying the nickel-containing powder.

7. The method according to claim 6, further comprising:
   subsequent to drying, subjecting the nickel-containing powder to a thermal treatment under an atmosphere of hydrogen or nitrogen.

8. The method according to claim 6, wherein the spray pyrolysis comprises passing the mixture through a furnace set for a temperature between 395° C. and 405° C. to provide at least some of the nickel-carbonitride spheres comprising a porous outer crust and a solid core.

9. The method according to claim 8, further comprising:
   subsequent to the spray pyrolysis, curing the nickel-carbonitride spheres by a thermal treatment to provide cured spheres comprising a porous outer crust and a hollow center defined by the porous outer crust.

10. The method according to claim 6, wherein the spray pyrolysis comprises passing the mixture through a furnace set for a temperature between 495° C. and 505° C. to provide at least some of the nickel-carbonitride spheres comprising a plurality of pores throughout the spheres.

11. The method according to claim 10, further comprising:
    subsequent to the spray pyrolysis, curing the nickel-carbonitride spheres by a thermal treatment to provide cured spheres comprising a plurality of pores formed throughout the spheres.

12. The method according to claim 6, wherein the spray pyrolysis comprises passing the mixture through a furnace set for a temperature between 595° C. and 605° C. to provide at least some of the nickel-carbonitride spheres which are substantially solid with little or no pores.

13. The method according to claim 12, further comprising:
    subsequent to the spray pyrolysis, curing the nickel-carbonitride spheres by a thermal treatment to provide cured spheres comprising a solid body with little or no pores.

14. A method of preparing a nickel-carbonitride sphere, the method comprising:
    providing a nickel-melamine resin mixture;
    conducting spray pyrolysis using the mixture at a first temperature to produce a first nickel-containing powder comprising at least one of first nickel-carbonitride spheres that are substantially solid with little or no pores, second nickel-carbonitride spheres that are porous throughout, or third nickel-carbonitride sphere comprising a porous outer crust and a solid core;
    adjusting temperature of the spray pyrolysis from the first temperature to a second temperature; and
    conducting the spray pyrolysis using the mixture at the second temperature to produce a second nickel-containing powder, wherein the second nickel-containing powder comprises at least one of said first nickel-carbonitride spheres, second nickel-carbonitride spheres, or third nickel-carbonitride spheres, wherein the first nickel-containing powder has a substantially different composition from that of the second nickel-containing powder.

15. The method according to claim 14, wherein the first nickel-containing powder comprises the first spheres, and the second nickel-containing powder comprises either the second or the third spheres.

16. The method according to claim 14, wherein the mixture comprises a melamine-formaldehyde resin, a nickel salt and a surfactant.

17. The method according to claim 14, further comprising:
washing the first and second nickel-containing powder; and
drying the first and second nickel-containing powder.

18. The method according to claim 14, further comprising:
subsequent to the spray pyrolysis, curing the nickel-carbonitride spheres by a thermal treatment to provide cured spheres, wherein after curing the first spheres form spheres comprising a solid body with little or no pores, the second spheres form spheres comprising a plurality of pores formed throughout the spheres, and the third spheres form spheres comprising a porous outer crust and a hollow center defined by the porous outer crust.

* * * * *